United States Patent [19]

Wetterhorn

[11] 4,176,558

[45] Dec. 4, 1979

[54] PRESSURE GAUGE CASING-TO-SOCKET CONSTRUCTION

[75] Inventor: Richard H. Wetterhorn, Fairfield, Conn.

[73] Assignee: Dresser Industries, Inc., Dallas, Tex.

[21] Appl. No.: 887,588

[22] Filed: Mar. 17, 1978

[51] Int. Cl.² .............................................. G01L 7/04
[52] U.S. Cl. ....................................... 73/741; 73/756
[58] Field of Search ............... 73/756, 742, 741, 743, 73/732, 733, 734, 735, 736, 737, 738, 739, 740, 431

[56] References Cited

U.S. PATENT DOCUMENTS

| | | | |
|---|---|---|---|
| 3,293,917 | 12/1966 | Vanderheyden | 73/741 |
| 3,357,394 | 12/1967 | Ingham et al. | 73/738 |
| 3,981,199 | 9/1976 | Moore et al. | 73/431 |
| 4,055,085 | 10/1977 | Wetterhorn | 73/740 |

*Primary Examiner*—Donald O. Woodiel
*Attorney, Agent, or Firm*—Daniel Rubin

[57] ABSTRACT

The casing wall about the aperture through which the Bourdon tube socket connection is received in a pressure gauge cooperates with at least two contiguous surface areas spaced apart on the socket to form a bidirectional casing-to-socket interlock thereat. By means of fasteners securing the casing to the socket, the bidirectional interlock is maintained as to afford the casing increased resistance against a percussive blow of potentially bending magnitude received in either direction.

13 Claims, 11 Drawing Figures

PRESSURE GAUGE CASING-TO-SOCKET CONSTRUCTION

BACKGROUND OF THE INVENTION

The field of art to which the invention pertains includes the art of measuring and testing as directed to a socket-to-casing construction of a pressure gauge.

Pressure gauges enjoy very extensive commercial and industrial use and are consequently regarded as high production items. Because of such wide use, they are supplied by a plurality of manufacturers and sold in very price conscious competition. Each manufacturer instinctively strives to reduce product costs by improvements, however marginal, which reduce labor and/or materials that could contribute to cost savings in the end product.

Commonly affording pressure sensitivity in the pressure gauge is a Bourdon tube of a pressure tight construction having a free end displaceably movable in response to pressure changes supplied at its inlet. To translate tube displacement into values of pressure, a geared movement or the like is connected between the free end of the Bourdon tube and a pointer. The pointer in turn is advanced by the movement relative to a calibrated dial face in correlation with changes in pressures of a measured condition. As typically constructed, pressure being measured is communicated via a bored stem and socket to the inlet end of the Bourdon tube. The socket extends through an aperture in the casing which encloses these components with clearances that enable the various operative displacements to be performed.

Whether the socket extends through the back or bottom of the casing, it is customary to secure the operating components in their final placement by means of one or more fastener screws attaching a raised wall of the socket against an internal surface of the casing. Unfortunately, however, it has been found that such gauges when installed in service occasionally encounter percussive blows inflicted inadvertently by passing objects, mishandling or the like, of magnitude sufficient to bend the casing into an offset relation with its contents. When this occurs, the stem axis becomes tilted or canted relative to the internal walls of the casing posing a problem that can be potentially acute where the casing is of relatively soft material such as plastic or thin sheet metal stock. Where the extent of bending offset between socket and casing is sufficient to place the operating mechanism and the surrounding internal surfaces of the casing into an interference contact, operational accuracy of the instrument, if in fact still operational, can be deleteriously affected to a large degree.

A problem of the foregoing type represents not only a potential hazard from inoperation or inaccurate information provided by the gauge but can and frequently is regarded by the owners of such gauges as reflecting adversely on the quality of the gauge manufacture. In order to preclude against either of these possibilities, it has been necessary therefore to somehow reinforce the rigidity of the casing in the area about the fastened components by such obvious approaches as increased casing thickness, increased number of fasteners, etc. While either of the latter can, of course, be considered a solution to the immediate problem of increasing resistance to case bending, both represent relatively expensive solutions adding significantly to the cost of an otherwise highly cost conscious product. A construction for increased unidirectional rigidity is known and has proven helpful but has been ineffective if the inflicted blow is opposite in direction to that being provided against. Despite recognition of the foregoing, a ready solution has not heretofore been known.

SUMMARY OF THE INVENTION

This invention relates to pressure gauges and more specifically to a bidirectional casing-to-socket interlock in such gauges affording increased casing rigidity and resistance to a potentially received percussive blow inflicted in either direction without any perceptible added costs being encountered in the gauge manufacture. Not only therefore is such a construction able to provide the added casing ridigity to minimize the likelihood of an operational interference being eventually encountered, for example, between the Bourdon tube and casing as a result of an inflicted blow, but unlike similar purpose prior art construction is afforded the benefits thereof at essentially zero cost of manufacture.

These results are achieved in accordance herewith by means of a bidirectional interlock formed between casing and socket during assembly via cooperating engagement of the casing wall and at least two contiguous surfaces on the socket. The effect thereof is to provide an area of casing rigidity more resistant to a lateral blow received in either direction secured by the interlock. In one embodiment particularly adapted for a back connection, the socket is formed as-cast with a pair of parallel upstanding lips defining an intermediate channel at a location coincident with where the installed socket in the provided aperture intersects the casing wall. An aperture edge of the casing wall is received in the channel when assembled sandwiched between the lips in a bidirectional or opposing grip. In conjunction with a socket surface displaced therefrom for fastener seating against the casing, the entire casing surface about the connection is significantly reinforced against a bending moment if inflicted in either direction laterally toward the casing. In a second embodiment particularly adapted for a lower connection, the casing aperture is of a more or less L-shaped configuration such that the larger leg portion provides ample clearance that can readily receive the inserted socket in the initial assembly step. The socket is then laterally shifted into the smaller or foot portion of the aperture that provides a snug contiguous grip fit therewith interlocking the case and socket in one direction. Via a similar socket seating surface as above, an interlock is provided in the opposite direction when fastened to the casing. In either of the above embodiments, it is apparent that neither incurs added cost factors associated with additional screws with associated tapping, added materials, added labor or the like, as to essentially effect a zero expense in providing this enhanced construction feature.

It is therefore an object of the invention to provide a novel construction affording enhanced bidirectional casing rigidity about the socket aperture of a pressure gauge.

It is a further object of the invention to effect the previous object in an uncostly manner as to afford the enhanced construction without detracting from the cost conscious competitiveness of the product line.

It is a still further object of the invention to effect the previous objects with an interlock construction between casing and socket effecting enhanced bidirectional casing rigidity about the socket aperture in a highly efficient manner.

Figure 1:
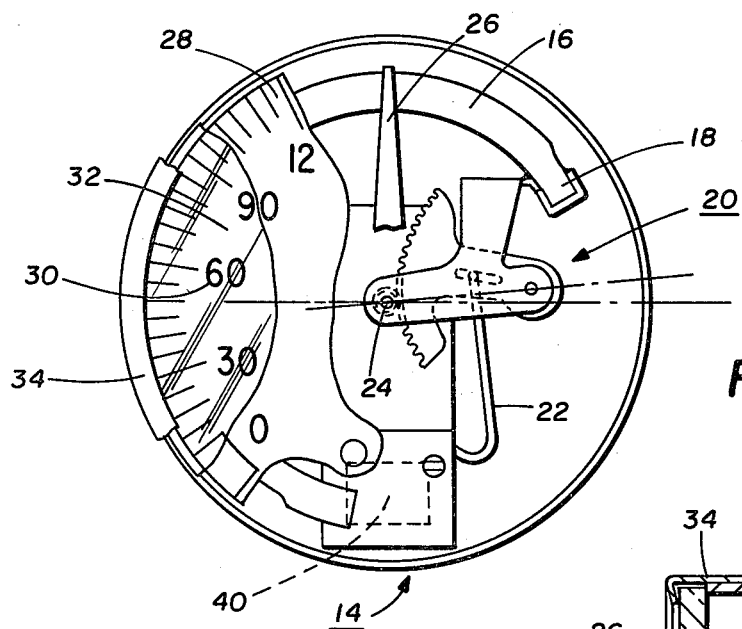
FIG. 1 is a front view partially fragmented of a pressure gauge constructed in accordance with a first embodiment thereof.
Figure 4:
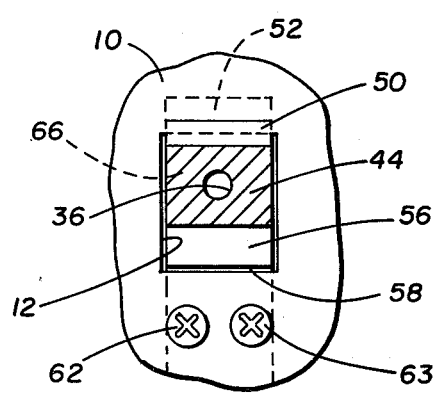
FIG. 4 is a sectional view taken substantially along the lines 4—4 of FIG. 2.
Figure 2:
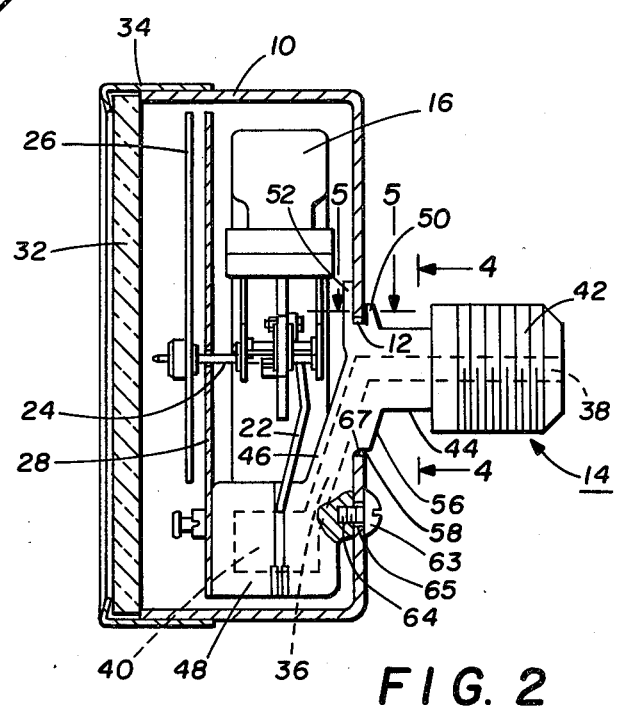
FIG. 2 is an end view partially sectioned of the gauge embodiment of FIG. 1.

For an understanding of the invention, reference is initially made to FIGS. 1 and 2 of the drawings in which there is illustrated a gauge construction of a type generally disclosed in U.S. Pat. No. 4,055,085. Briefly, the shown gauge comprises a casing 10 containing a back aperture 12 for receiving socket 14, to be described, whereby pressure from an external source is communicated to Bourdon tube 16. Mounted on the free end 18 of the Bourdon tube is an amplifier, designated 20, which in conjunction with actuator rod 22 rotates a shaft 24 supporting a pointer 26. Rotation of shaft 24 displaces pointer 26 opposite a dial face 28 to reflect values 30 of pressure being received at the inlet 38 of socket 14. A crystal 32 retained by bezel 34 encloses the front face of the gauge and through which values of pressure indicated by pointer 26 can be readily ascertained.

Figure 3:
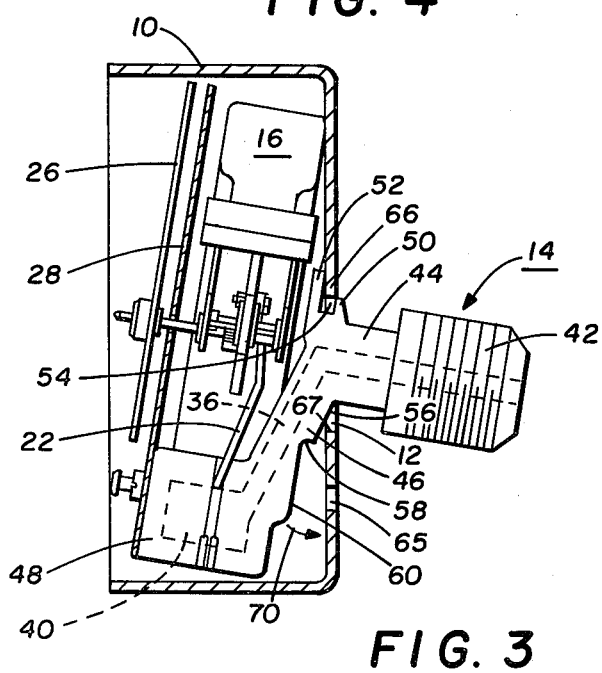
FIG. 3 is a fragmentary view similar to FIG. 2 for illustrating an assembly step thereof.
Figure 5:
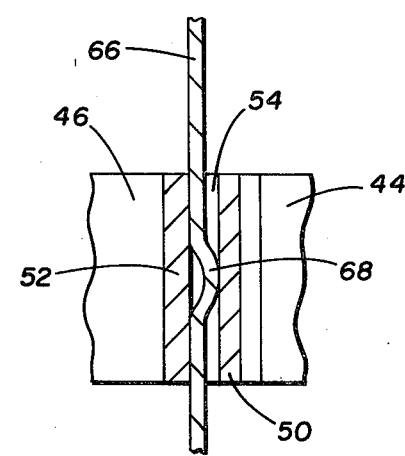
FIG. 5 is an enlarged fragmentary view as seen substantially along the lines 5—5 of FIG. 2.
Figure 6:
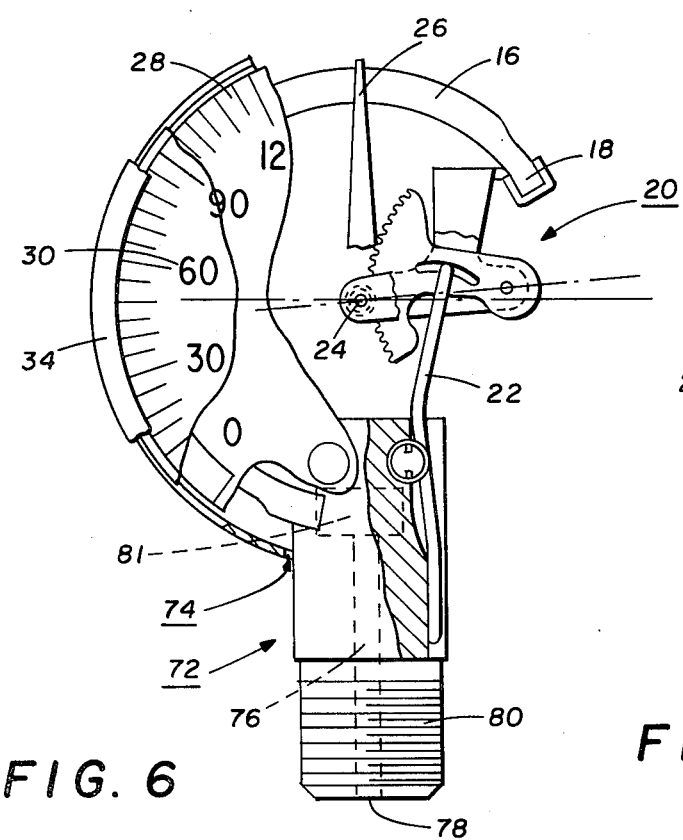
FIG. 6 is a front view partially fragmented of a pressure gauge constructed in accordance with a second embodiment hereof.
Figure 7:
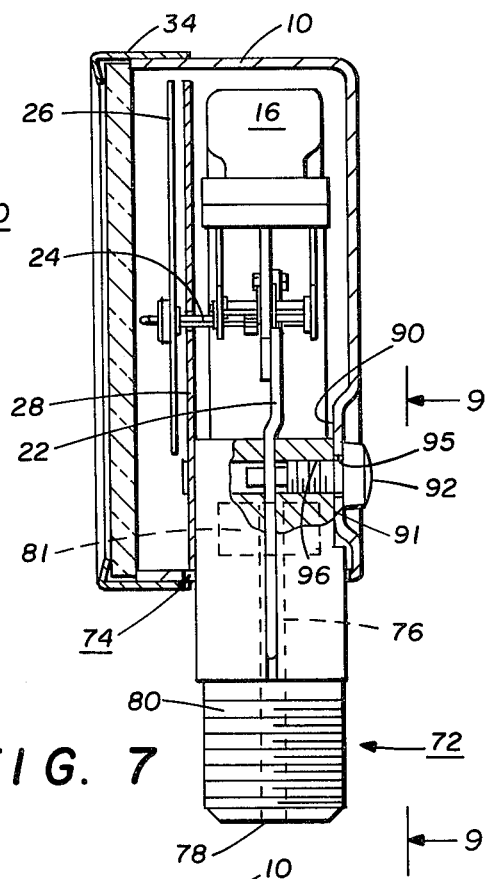
FIG. 7 is an end view partially sectioned of the gauge embodiment of FIG. 6.
Figure 9:
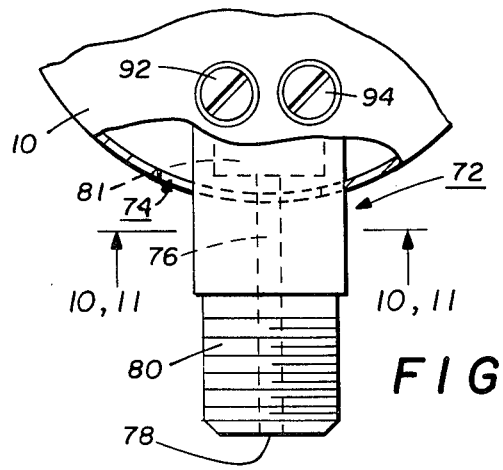
FIG. 9 is a fragmentary rear view as seen substantially along the lines 9—9 of FIG. 7.
Figure 8:
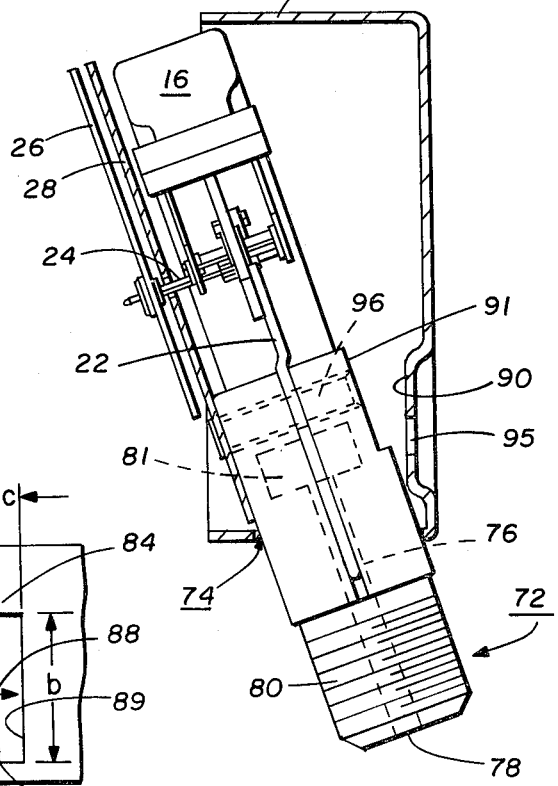
FIG. 8 is a partial end view similar to FIG. 7 for illustrating an assembly step thereof.
Figure 11:
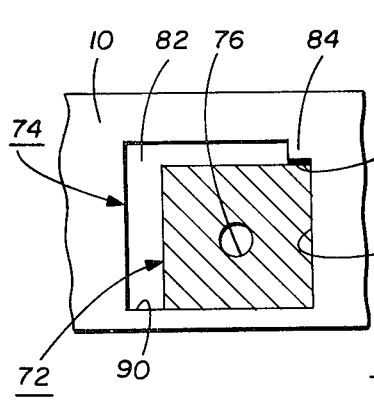
FIG. 11 is a post-interlocked sectional view taken substantially along the lines 11—11 of FIG. 9.

Socket 14, as can be most clearly seen in FIGS. 2 and 3, is comprised of an integral structure through which there are contained drilled passages 36 (shown dashed) extending from inlet 38 to cavity 40 in lower block 48. The inlet of Bourdon tube 16 is connected to cavity 40 for responding to values of pressure received thereat. Surrounding inlet 38 is a threaded stem 42 which merges inward with wrench flats 44 that in turn merge with inclined bridge 46 connected to lower block 48.

For effecting the interlock in accordance with the embodiment being described, there is contained integrally formed on the top side of bridge 46 juxtaposed to wrench flats 44, a pair of spaced apart, upstanding parallel lips 50 and 52 defining a transverse groove or channel 54 extending longitudinally therebetween. Contained on the underside of the bridge and inclined therewith is a fillet 56 terminating at a horizontal shoulder 58. The shoulder in turn merges with a vertical back surface 60 raised for flush seating against the inside of the casing wall thereat. Provided in back surface 60 are tappings 64 for conventionally receiving a pair of fastener screws 62 and 63 through casing aperture 65 at the appropriate assembly step. Channel 54 is adapted to receive the aperture edge 66 of the casing wall thereat in a sandwiched opposing grip and is ordinarily of a width sized to accommodate the largest contemplated wall thickness. For thinner wall sections a lateral boss or rib 68 is formed on the wall to make up any dimensional difference whereby the mentioned grip is ensured.

Forming the assembled interlock can be best understood by reference to FIG. 3 in which it can be seen that stem socket 14 is first inserted through aperture 12 in a tilted or inclined relation until channel 54 is positioned to receive wall edge 66. The stem socket can then be swung in the counterclockwise and slightly upward direction of arrow 70 until shoulder 58 is more or less seated on the underside case wall edge 67. This relation automatically places back surface 60 flush against the casing interior in the manner of FIG. 2 and when so held can receive fastener screws 62 and 63 for permanent retention. By this construction, lips 50 and 52 in sandwiching the intervening case wall 66 provide an effective and secured bidirectional interlock connection thereat. In cooperation with the permanent flush seating of surface 60 the interlock increases casing rigidity in the casing area therebetween against a potentially incurred bending moment as might be inflicted in either of the interlocked directions during installed placement of the gauge.

Referring now to FIGS. 6-10, the second embodiment in accordance herewith comprises a pressure gauge, the housing and operating components of which are generally similar to those of the above embodiment. Differences therefrom reside principally in use of a vertical socket 72 and the structural details by which the casing-to-socket interlock is effected. More specifically, socket 72 extends vertically through an aperture 74 on the underside of casing 10 and in cross section is more or less square. Centrally contained in the socket is a bored passage 76 extending from an inlet 78 at threaded stem 80 to an outlet 81 communicating with the inlet of Bourdon tube 16. Casing aperture 74 for containing socket 72 is of a more or less L-shaped configuration in which the leg or leftmost (as illustrated) portion 82 is rectangular of a height dimension "A" significantly greater than that of the socket 72 in order to provide free and unencumbered insertion of the socket when being installed in the manner of FIG. 10. Leg portion 82 essentially terminates rightward at a shoulder tab 84 beneath which is defined the foot portion 86. The latter is of a height dimension "B" smaller than "A" and sized to receive socket 72 in a snug contiguous fit therein. The width "C" of tab 84 can be varied to suit by increasing foot portion 86 rightward.

Figure 10:
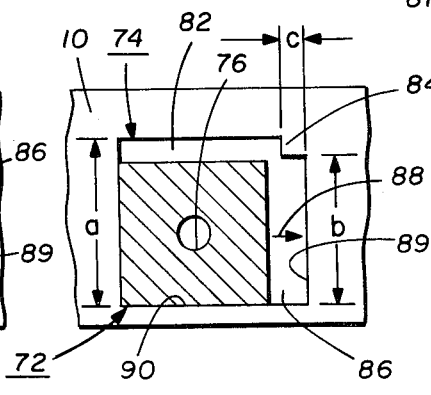
FIG. 10 is a pre-interlocked sectional view taken substantially along the lines 10—10 of FIG. 9.

In this embodiment the socket assembly is first inserted through aperture leg portion 82 in the manner of FIG. 10. When appropriately positioned, the socket is vertically oriented upright in the casing and then laterally shifted in the direction of arrow 88 into foot portion 86. This places the socket beneath tab 84 against side edge 89 and with its back surface 91 flush against the internal raised face 90 of the casing back wall. With the socket so placed, fastener screws 92 and 94 can be inserted through provided casing apertures 95 into socket tappings 96 for securing the casing and socket permanently in this arrangement.

When the socket is secured in the above manner, the underedge of tab 84 in cooperation with side edge 89 afford a snug, tight interfit with the socket surface thereat against a bending moment in one direction. By means of the displaced flush seating between the socket and casing surfaces 90 and 91, an interfit is provided against a bending moment in the opposite direction. The two interfits cooperate to afford the casing bidirectional rigidity in the area therebetween for enhanced bending resistance from a blow apt to be inflicted in either direction. Obviously, the magnitude of bending resistance provided by the interlock via tab 84 and surrounding edges can be varied by appropriate changes in dimensional and/or shape relationship.

By the above description there is disclosed a novel construction for the casing-to-socket connection of a pressure gauge able to increase casing rigidity for reinforced bidirectional resistance to bending moments from a percussive blow apt to be inflicted inadvertently against the casing in service. The construction by which this is obtained is relatively simple and efficient yet incurs virtually zero added manufacturing costs as not to detract from the otherwise cost conscious competitiveness of the product line represented by such gauges. By means, therefore, of a simple yet effective interlock construction, a long standing problem in the industry can be readily solved without incurring added cost of construction associated with previously known solutions to the problem. Whereas the pressure gauge has been described as the primary purpose for the interlock construction hereof, it is apparent that such construction could be applied similarly to other condition responsive instruments such as a pressure switch, temperature switch, temperature gauge, etc. in which a movable mechanism extending through the casing and rigidly attached thereto is operably responsive to external conditions sensed or determined.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In a condition responsive instrument including a condition responsive mechanism operably movable in response to condition changes of a measured condition state to which it is sensitive, a casing surrounding said condition responsive mechanism, a rigid socket member supporting said condition responsive mechanism and extending through an aperture in said casing for communicating a measured condition state from an external source to said condition responsive mechanism and attachment means securing said socket member to an internal surface of said casing at a location on said casing displaced from said aperture and in a manner providing a clearance relation between said condition responsive mechanism and the internal casing surfaces thereat, the improvement comprising interlock means cooperating with said attachment means for affording bidirectionally increased bending resistance of said casing, said interlock means including a contiguous fit formed between a wall surface of said socket member at said aperture and the opposing casing wall defining said aperture thereat.

2. In a condition responsive instrument according to claim 1 in which said instrument is pressure actuated and said condition responsive mechanism includes a Bourdon tube.

3. In a condition responsive instrument according to claims 1 or 2 in which said socket member wall surface comprises a pair of upstanding spaced apart lips defining an intervening channel receiving said opposing casing wall in an interfit sandwich gripping relation therebetween.

4. In a condition responsive instrument according to claim 3 including a second socket member wall surface displaced opposite the inlet axis of said socket member from said lip surface for receiving said attachment means.

5. In a condition responsive instrument according to claim 4 in which said casing aperture is defined in a back wall of said casing and said socket member inlet axis extends substantially perpendicular to the operating plane of said Bourdon tube.

6. In a condition responsive instrument according to claims 1 or 2 in which the casing aperture is shaped including a first portion of size larger than said socket member and a second portion sized closely corresponding to first surface dimensions of said socket member for effecting said contiguous fit.

7. In a condition responsive instrument according to claim 6 in which said interlock means is relatively most effective to resist a casing bend in one direction and said attachment means is at least comparably effective in an opposite direction.

8. In a condition responsive instrument according to claim 7 in which said casing aperture is located in a side wall of said casing and said socket inlet axis extends substantially parallel to the operating plane of said Bourdon tube.

9. In a condition responsive instrument including a condition responsive mechanism operably movable in response to condition changes of a measured condition state to which it is sensitive, a casing surrounding said condition responsive mechanism, a rigid socket member supporting said condition responsive mechanism and extending through an aperture in said casing for communicating a measured condition state from an external source to said condition responsive mechanism and attachment means securing said socket member to an internal surface of said casing in a manner providing a clearance relation between said condition responsive mechanism and the internal casing surfaces thereat, the improvement comprising interlock means bidirectionally effective against a percussive blow inflicted against said casing for resisting relative bending thereof, said interlock means effecting a contiguous fit between at least two displaced wall surfaces of said socket member and the adjacent casing wall surfaces thereat and comprising said casing aperture being shaped to include a first aperture portion of size larger than said socket member and a second aperture portion sized closely corresponding to first surface dimensions of said socket member for providing one of said contiguous fits in the assembled relation of the instrument.

10. In a condition responsive instrument according to claim 9 in which said instrument is pressure actuated and said condition responsive mechanism comprises a Bourdon tube.

11. In a condition responsive instrument according to claims 9 or 10 in which the other of said contiguous fits comprising said interlock means includes a second socket member surface displaced from said first socket member surface for receiving said attachment means.

12. In a condition responsive instrument according to claim 11 in which said first fit is relatively most effective against a blow inflicted in one direction and said second fit is at least comparably effective in an opposite direction.

13. In a condition responsive instrument according to claim 12 in which said casing aperture is located in a side wall of said casing and said socket member inlet axis extends substantially parallel to the operating plane of said Bourdon tube.

* * * * *